United States Patent
Park et al.

(10) Patent No.: US 11,732,071 B2
(45) Date of Patent: Aug. 22, 2023

(54) OLEFIN-BASED COPOLYMER AND METHOD FOR PREPARING THE SAME

(71) Applicant: LG Chem, Ltd., Seoul (KR)

(72) Inventors: Sang Eun Park, Daejeon (KR); Eun Jung Lee, Daejeon (KR); Hyun Jin Ju, Daejeon (KR); In Sung Park, Daejeon (KR); Choong Hoon Lee, Daejeon (KR); Jin Sam Gong, Daejeon (KR); Jung Ho Jun, Daejeon (KR); Rae Keun Gwak, Daejeon (KR)

(73) Assignee: LG Chem, Ltd.

( * ) Notice: Subject to any disclaimer, the term of this patent is extended or adjusted under 35 U.S.C. 154(b) by 364 days.

(21) Appl. No.: 17/050,089

(22) PCT Filed: May 3, 2019

(86) PCT No.: PCT/KR2019/005366
§ 371 (c)(1),
(2) Date: Oct. 23, 2020

(87) PCT Pub. No.: WO2019/212306
PCT Pub. Date: Nov. 7, 2019

(65) Prior Publication Data
US 2021/0230326 A1    Jul. 29, 2021

(30) Foreign Application Priority Data

May 4, 2018 (KR) .................. 10-2018-0052044

(51) Int. Cl.
*C08F 210/16*    (2006.01)

(52) U.S. Cl.
CPC ........ *C08F 210/16* (2013.01); *C08F 2420/02* (2013.01); *C08F 2420/06* (2013.01); *C08F 2500/12* (2013.01); *C08F 2500/18* (2013.01)

(58) Field of Classification Search
CPC .................................................. C08F 210/16
See application file for complete search history.

(56) References Cited

U.S. PATENT DOCUMENTS

| | | | |
|---|---|---|---|
| 4,935,474 A | 6/1990 | Ewen et al. | |
| 5,914,289 A | 6/1999 | Razavi | |
| 6,828,394 B2 | 12/2004 | Vaughan et al. | |
| 6,841,631 B2 | 1/2005 | Loveday et al. | |
| 6,894,128 B2 | 5/2005 | Loveday et al. | |
| 8,173,828 B2 | 5/2012 | Voskoboynikov et al. | |
| 8,772,625 B2 * | 7/2014 | Ikenaga | C09D 123/0815 526/348 |
| 9,249,289 B2 * | 2/2016 | Ferrari | C08F 210/08 |
| 9,349,895 B2 * | 5/2016 | Ikenaga | C08K 5/14 |
| 11,339,235 B2 * | 5/2022 | Park | C08F 2/01 |
| 11,542,352 B2 * | 1/2023 | Park | C08F 4/65904 |
| 2005/0154158 A1 | 7/2005 | Hanaoka et al. | |
| 2005/0234197 A1 | 10/2005 | Goldberg et al. | |
| 2006/0111525 A1 | 5/2006 | Hanaoka et al. | |
| 2007/0276111 A1 | 11/2007 | Goldberg et al. | |
| 2010/0036066 A1 | 2/2010 | Fujimura et al. | |
| 2010/0087609 A1 | 4/2010 | Park et al. | |
| 2010/0113720 A1 | 5/2010 | Ok et al. | |
| 2011/0282011 A1 | 11/2011 | Ok et al. | |
| 2012/0172534 A1 | 7/2012 | Krabbenborg | |
| 2012/0220728 A1 | 8/2012 | Uekusa et al. | |
| 2012/0316299 A1 | 12/2012 | Chen et al. | |
| 2013/0085246 A1 | 4/2013 | Kum et al. | |
| 2013/0167911 A1 | 7/2013 | Ikenaga et al. | |
| 2015/0045526 A1 | 2/2015 | Kum et al. | |
| 2015/0158965 A1 | 6/2015 | Batra et al. | |
| 2015/0372158 A1 | 12/2015 | Tanabe et al. | |
| 2016/0326281 A1 | 11/2016 | Kim et al. | |
| 2017/0145122 A1 | 5/2017 | Kim et al. | |
| 2018/0201706 A1 | 7/2018 | Park et al. | |
| 2018/0371116 A1 | 12/2018 | Kim et al. | |

FOREIGN PATENT DOCUMENTS

| | | |
|---|---|---|
| CA | 2601275 A1 | 9/2006 |
| CN | 1951943 A | 4/2007 |
| CN | 101616938 A | 12/2009 |
| CN | 101679561 A | 3/2010 |
| CN | 102083871 A | 6/2011 |
| CN | 102725345 A | 10/2012 |
| CN | 102918068 A | 2/2013 |
| CN | 102971346 A | 3/2013 |
| CN | 103140940 A | 6/2013 |
| CN | 103554461 A | 2/2014 |
| CN | 104380480 A | 2/2015 |
| CN | 106488923 A | 3/2017 |
| CN | 106661142 A | 5/2017 |
| EP | 0989140 A1 | 3/2000 |
| EP | 1359192 A1 | 11/2003 |
| EP | 2478053 A1 | 7/2012 |
| EP | 2866267 A1 | 4/2015 |
| EP | 2993704 A1 | 3/2016 |
| EP | 3456724 A1 | 3/2019 |
| JP | H1077370 A | 3/1998 |
| JP | 2008540697 A | 11/2008 |

(Continued)

OTHER PUBLICATIONS

Extended European Search Report including Written Opinion for Application No. 19797145.0 dated May 6, 2021, pp. 1-7.
Search Report dated Aug. 11, 22 from Office Action for Chinese Application No. 2019800263116 issued Aug. 26, 2022. 3 pgs.
Search report from International Application No. PCT/KR2019/005366, dated Aug. 14, 2019.

*Primary Examiner* — Rip A Lee
(74) *Attorney, Agent, or Firm* — Lerner David LLP

(57) ABSTRACT

An olefin-based copolymer and method of making the same are disclosed herein. In some embodiments, the olefin-based copolymer includes a repeating unit derived from an alpha-olefin, wherein the alphas-olefin is present in the copolymer at 15 wt % to 45 wt %, wherein the copolymer has a density (d) of 0.85 to 0.89 g/cc, a melt index (MI), measured at 190° C. and 2.16 kg load, of 15 g/10 min to 100 g/10 min, and a hardness defined by Equation 1. The olefin-based copolymer has improved hardness and is highly flowable, and may show improved physical properties of tensile strength, elongation rate and flexural modulus.

10 Claims, No Drawings

(56) References Cited

FOREIGN PATENT DOCUMENTS

| | | | |
|---|---|---|---|
| JP | 2012238857 | A | 12/2012 |
| JP | 5379677 | B2 | 12/2013 |
| KR | 20040076965 | A | 9/2004 |
| KR | 101097378 | B1 | 12/2011 |
| KR | 20150035707 | A | 4/2015 |
| KR | 20160054849 | A | 5/2016 |
| KR | 20170067499 | A | 6/2017 |
| KR | 20170073385 | A | 6/2017 |

\* cited by examiner

OLEFIN-BASED COPOLYMER AND METHOD FOR PREPARING THE SAME

CROSS-REFERENCE TO RELATED APPLICATIONS

The present application is a national phase entry under 35 U.S.C. § 371 of International Application No. PCT/KR2019/005366, filed on May 3, 2019, which claims priority from Korean Patent Application No. 10-2018-0052044, filed on May 4, 2018, the disclosures of which are incorporated by reference herein.

TECHNICAL FIELD

The present invention relates to an olefin-based copolymer and a method for preparing the same, and particularly, to an olefin-based copolymer having high flowability and improved physical properties such as hardness, flexural strength and tensile strength, and a method for preparing the same.

BACKGROUND ART

Olefin polymerization catalyst systems may be classified into Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites coexist and has the characteristics of broad molecular weight distribution of a polymer; in addition, since the composition distribution of a comonomer is nonuniform, there are limitations in securing desired physical properties.

Meanwhile, the metallocene catalyst is composed of the combination of a main catalyst having a transition metal compound as a main component and a cocatalyst which is an organometal compound having aluminum as a main component, and such a catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, a molecular weight, crystallinity, etc. of a polymer may be changed.

U.S. Pat. No. 5,914,289 discloses a method of controlling the molecular weight and molecular weight distribution of a polymer using metallocene catalysts supported by individual supports, but the amount of a solvent used for preparing a supported catalyst and preparation time are consumed a lot, and there is inconvenience to support the metallocene catalysts used on individual supports.

Korean Patent Application No. 10-2003-0012308 discloses a method of controlling molecular weight distribution by supporting a dinuclear metallocene catalyst and a mononuclear metallocene catalyst together with an activator on a support and polymerizing while changing the combination of the catalysts in a reactor. However, such method has limitations in accomplishing the properties of individual catalysts at the same time, and a metallocene catalyst part is separated from a support component of a completed catalyst, thereby inducing fouling in a reactor.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation rate, and excellent tensile strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared as a metallocene catalyst using at least two kinds of metal compounds, and is applicable to the use of a film, a blow molding, a pipe, etc. However, such products have improved processability but a nonuniform dispersion state by the molecular weight in a unit particle, and extrusion appearance is rough and physical properties are unstable though under relatively good extrusion conditions.

In such a background, the preparation of an excellent product making balance between physical properties and processability is continuously required, and particularly, a polyethylene copolymer having excellent processability is increasingly required.

DISCLOSURE OF THE INVENTION

Technical Problem

The task to solve in the present invention is to provide a low-density olefin-based copolymer having high flowability and improved physical properties such as hardness, flexural strength and tensile strength.

In addition, another task to solve in the present invention is to provide a method for preparing the olefin-based copolymer.

Technical Solution

In order to solve the task, the present invention provides an olefin-based copolymer, wherein (1) a density (d) is 0.85 to 0.89 g/cc, (2) a melt index (MI, 190° C., 2.16 kg load conditions) is 15 g/10 min to 100 g/10 min, (3) hardness defined by the following Equation 1, and (4) a repeating unit derived from alpha olefin is from 15 wt % to 45 wt %:

$$\text{Hardness} = 0.0082 \times MI^2 - 0.99 \times d \times MI + A \qquad \text{[Equation 1]}$$

(in Equation 1, A satisfies 97×d<A<101×d).

In addition, in order to solve another task, the present invention provides a method for preparing the olefin-based copolymer including a step of polymerizing an olefin-based monomer by injecting hydrogen in 10 to 100 cc/min in the presence of a catalyst composition for polymerizing olefin, including a transition metal compound represented by the following Formula 1:

[Formula 1]

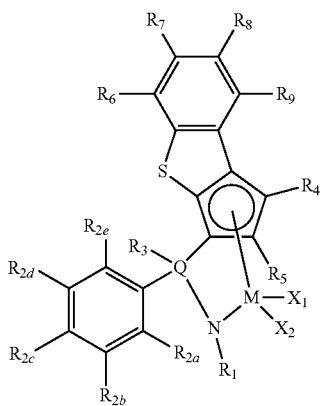

in Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 6 to 20 carbon atoms; arylalkyl of 7 to 20 carbon atoms; alkyl amido of 1 to 20 carbon atoms; aryl amido of 6 to 20 carbon atoms; alkylidene of 1 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; where among the $R_6$ to $R_9$, adjacent two or more may be connected with each other to form a ring, Q is Si, C, N, P or S, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; arylamino of 6 to 20 carbon atoms; or alkylidene of 1 to 20 carbon atoms.

Advantageous Effects

The olefin-based copolymer according to the present invention has improved hardness and is highly flowable, and may show improved physical properties of tensile strength, elongation rate and flexural modulus when compared with a copolymer having an equivalent degree of density.

BEST MODE FOR CARRYING OUT THE INVENTION

Hereinafter, the present invention will be described in more detail to assist the understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "polymer" used in the present disclosure means a polymer compound prepared by polymerizing monomers which are the same or different types. The common term, "polymer" includes a term, "interpolymer" as well as "homopolymer", "copolymer" and "terpolymer". The term "interpolymer" means a polymer prepared by polymerizing two or more different types of monomers. The common term "interpolymer" includes a term "copolymer" (commonly used to refer a polymer prepared from two different monomers) and a term "terpolymer" (commonly used to refer a polymer prepared from three different monomers). The term "interpolymer" includes a polymer prepared by polymerizing four or more types of monomers.

The olefin-based copolymer according to the present invention satisfies the following conditions (1) to (4):

(1) a density (d) is 0.85 to 0.89 g/cc, (2) a melt index (MI, 190° C., 2.16 kg load conditions) is 15 g/10 min to 100 g/10 min, (3) hardness defined by the following Equation 1, and (4) a repeating unit derived from alpha olefin measured through nuclear magnetic spectroscopic analysis is from 15 wt % to 45 wt %:

$$\text{Hardness}=0.0082 \times MI^2 - 0.99 \times d \times MI + A \qquad \text{[Equation 1]}$$

(in Equation 1, A satisfies 97×d<A<101×d).

If measured according to ASTM D-792, the olefin-based copolymer according to the present invention shows a low density of 0.85 g/cc to 0.89 g/cc, particularly, 0.855 to 0.89 g/cc, more particularly, 0.86 to 0.89 g/cc. The olefin-based copolymer according to the present invention shows low density in the above-described range.

The melt index (MI) may be controlled by controlling the amount used of a catalyst used in a process of polymerizing an olefin-based copolymer with respect to a comonomer, and influences the mechanical properties, impact strength, and moldability of the olefin-based copolymer. In this disclosure, the melt index is measured in low-density conditions of 0.85 to 0.89 g/cc, and measured under 190° C. and 2.16 kg load conditions according to ASTM D1238, and may be 15 g/10 min to 100 g/10 min, particularly, 15 g/10 min to 80 g/10 min, more particularly, 16 g/10 min to 70 g/10 min.

The (3) hardness, density and melt index (MI) of the olefin-based copolymer of the present invention, satisfy the following Equation 1, and according to the satisfaction of Equation 1, the olefin-based copolymer of the present invention may show improved hardness, tensile strength, elongation rate and flexural modulus when compared with the conventional copolymer which has equivalent density and melt index:

$$\text{Hardness} = 0.0082 \times MI^2 - 0.99 \times d \times MI + A \quad \text{[Equation 1]}$$

(in Equation 1, A satisfies 97×d<A<101×d)

In addition, the olefin-based copolymer of the present invention may include (4) a repeating unit derived from alpha olefin, if measured through nuclear magnetic spectroscopic analysis, in amounts from 15 wt % to 45 wt %, particularly, 20 wt % to 45 wt %, more particularly, 20 wt % to 40 wt %.

The olefin-based copolymer according to an embodiment of the present invention may further satisfy (5) a weight average molecular weight (Mw) of 10,000 to 80,000 g/mol, and the weight average molecular weight (Mw) may be particularly, 20,000 g/mol to 70,000 g/mol, more particularly, 30,000 g/mol to 65,000 g/mol.

In addition, the olefin-based copolymer according to an embodiment of the present invention may further satisfy a ratio (Mw/Mn) of a weight average molecular weight (Mw) and a number average molecular weight (Mn), i.e., (6) molecular weight distribution (MWD) of 1.5 to 3.0, and the molecular weight distribution may particularly be 1.5 to 2.5, more particularly, 1.9 to 2.15.

In the present invention, the weight average molecular weight (Mw) and number average molecular weight (Mn) are polystyrene conversion molecular weights which are analyzed by gel permeation chromatography (GPC).

Generally, the density of an olefin-based polymer is influenced by the kind and amount of a monomer used during polymerization, a polymerization degree, etc., and a copolymer may be largely influenced by the amount of a comonomer. The olefin-based copolymer of the present invention is copolymerized by injecting hydrogen ($H_2$) into a catalyst composition including a transition metal compound having a characteristic structure, and a large amount of comonomer may be introduced to achieve a low density in the above-described range, and thus, hardness may be increased when compared with the conventional copolymer having the same density, and as a result, further improved physical properties such as tensile strength, elongation rate, and flexural modulus when compared with the conventional copolymer may be achieved.

In addition, the olefin-based copolymer according to the present invention may show narrow molecular weight distribution in the above-described range by injecting an optimal amount of hydrogen during polymerization reaction for preparing thereof and controlling molecular weight distribution.

In addition, the olefin-based polymer according to an embodiment of the present invention may have hardness (shore A) of 30 to 80, particularly, 40 to 80, more particularly, 50 to 80. The olefin-based polymer may show higher hardness (shore A) with the equivalent degrees of density and melt index values when compared with a commonly used conventional olefin-based polymer, and accordingly, may have improved tensile strength, elongation rate and flexural modulus.

The olefin-based copolymer may be a copolymer of an olefin-based monomer, particularly, two or more selected among an alpha-olefin-based monomer, a cyclic olefin-based monomer, a diene olefin-based monomer, a triene olefin-based monomer and a styrene-based monomer.

The alpha-olefin monomer may include any one selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethylstyrene, or a mixture of two or more thereof.

Particularly, the olefin-based copolymer may be a copolymer of ethylene and an alpha-olefin-based monomer of 3 to 12 carbon atoms, particularly, a copolymer of ethylene and an alpha-olefin-based monomer of 3 to 10 carbon atoms.

More particularly, the olefin copolymer according to an embodiment of the present invention may be a copolymer of ethylene with propylene, ethylene with 1-butene, ethylene with 1-hexene, ethylene with 4-methyl-1-pentene or ethylene with 1-octene.

In an embodiment of the present invention, the olefin-based copolymer may be a copolymer of ethylene and 1-octene, and may have tensile elongation of 500% or more, and tensile strength of 20 kgf/cm$^2$ or more, measured based on ASTM D638 (50 mm/min), and flexural modulus (Secant 1%) of 10 kgf/cm$^2$ or more, measured based on ASTM D790. Particularly, the olefin-based copolymer may be a copolymer of ethylene and 1-octene, and may have tensile elongation of 1,000% or more, and tensile strength of 25 kgf/cm$^2$ to 40 kgf/cm$^2$, measured based on ASTM D638 (50 mm/min), and flexural modulus (Secant 1%) of 10.0 kgf/cm$^2$ to 30.0 kgf/cm$^2$, measured based on ASTM D790.

In addition, in an embodiment of the present invention, the olefin-based copolymer may be a copolymer of ethylene and 1-butene, and may have tensile elongation of 500% or more, and tensile strength of 20 kgf/cm$^2$ to 50 kgf/cm$^2$, measured based on ASTM D638 (50 mm/min), and flexural modulus (Secant 1%) of 10.0 kgf/cm$^2$ or more, measured based on ASTM D790. Particularly, the olefin-based copolymer may be a copolymer of ethylene and 1-butene, and may have tensile elongation of 500% to 1,000%, and tensile strength of 20 kgf/cm$^2$ to 40 kgf/cm$^2$, measured based on ASTM D638 (50 mm/min), and flexural modulus (Secant 1%) of 10.0 kgf/cm$^2$ to 30.0 kgf/cm$^2$, measured based on ASTM D790.

The olefin-based copolymer according to an embodiment of the present invention, having the above-described physical properties and configurational characteristics may be prepared by continuous solution polymerization reaction by which an olefin-based monomer is polymerized by continuously injecting hydrogen in the presence of a metallocene catalyst composition including one or more transition metal compounds in a single reactor.

Accordingly, in the olefin-based copolymer according to an embodiment of the present invention, a block formed by linearly connecting two or more repeating units derived from any one monomer among the monomers constituting a polymer is not formed in the polymer. That is, the olefin-based copolymer according to the present invention does not include a block copolymer but may be selected from the group consisting of a random copolymer, an alternating copolymer and a graft copolymer, and more particularly, may be a random copolymer.

Particularly, the olefin-based copolymer of the present invention may be obtained by a preparation method including a step of polymerizing an olefin-based monomer by injecting hydrogen in 10 to 100 cc/min in the presence of a catalyst composition for polymerizing olefin, including a transition metal compound of Formula 1 below.

However, in preparing the olefin-based copolymer according to an embodiment of the present invention, the structure range of the transition metal compound is not limited to a specifically shown type, but it should be understood that all modifications, equivalents and replacements, included in the spirit and technical scope of the present invention are included.

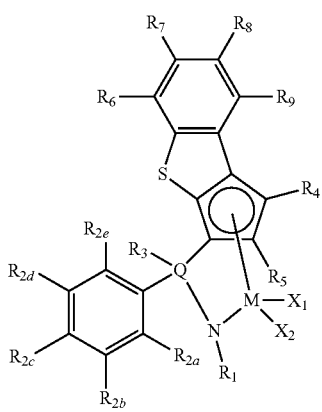

[Formula 1]

in Formula 1,

R$_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, R$_{2a}$ to R$_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, R$_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 6 to carbon atoms; arylalkyl of 7 to 20 carbon atoms; alkyl amido of 1 to 20 carbon atoms; aryl amido of 6 to 20 carbon atoms; alkylidene of 1 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, R$_4$ to R$_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; among the R$_6$ to R$_9$, adjacent two or more may being connected with each other to form a ring, Q is Si, C, N, P or S, M is a transition metal in group 4, and X$_1$ and X$_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; arylamino of 6 to 20 carbon atoms; or alkylidene of 1 to 20 carbon atoms.

In an embodiment of the present invention, in the transition metal compound of Formula 1 above, R$_1$ may be hydrogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, R$_{2a}$ to R$_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, R$_3$ may be hydrogen; halogen; alkyl of 1 to 12 carbon atoms; cycloalkyl of 3 to 12 carbon atoms; alkenyl of 2 to 12 carbon atoms; aryl of 6 to 20 carbon atoms; alkylaryl of 7 to 13 carbon atoms; arylalkyl of 7 to 13 carbon atoms; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl, R$_4$ to R$_9$ may be each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms, among the R$_6$ to R$_9$, adjacent two or more may be connected with each other to form an aliphatic ring of 5 to 20 carbon atoms or an aromatic ring of 6 to 20 carbon atoms; where the aliphatic ring or the aromatic ring may be substituted with alkyl of 1 to 20 carbon atoms, alkenyl of 2 to 12 carbon atoms, or aryl of 6 to 12 carbon atoms, Q may be Si, M may be Ti, and X$_1$ and X$_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; arylamino of 6 to 12 carbon atoms; or alkylidene of 1 to 12 carbon atoms.

In another embodiment of the present invention, in the transition metal compound of Formula 1 above, R$_1$ may be hydrogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms, R$_{2a}$ to R$_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl, R$_3$ may be hydrogen; halogen; alkyl of 1 to 12 carbon atoms; cycloalkyl of 3 to 12 carbon atoms; alkenyl of 2 to 12 carbon atoms; alkylaryl of 7 to 13 carbon atoms; arylalkyl of 7 to 13 carbon atoms; phenyl; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl, R$_4$ to R$_9$ may be each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms, among the R$_6$ to R$_9$, adjacent two or more may be connected with each other to form an aliphatic ring of 5 to 12 carbon atoms or an aromatic ring of 6 to 12 carbon atoms;

the aliphatic ring or the aromatic ring may be substituted with halogen, alkyl of 1 to 12 carbon atoms, alkenyl of 2 to 12 carbon atoms, or aryl of 6 to 12 carbon atoms, Q may be Si, M may be Ti, and $X_1$ and $X_2$ may be each independently hydrogen; halogen; alkyl of 1 to 12 carbon atoms; or alkenyl of 2 to 12 carbon atoms.

In addition, in another embodiment of the present invention, in the transition metal compound of Formula 1 above, $R_1$ may be hydrogen or alkyl of 1 to 12 carbon atoms, $R_{2a}$ to $R_{2e}$ may be each independently hydrogen; alkyl of 1 to 12 carbon atoms; or alkoxy of 1 to 12 carbon atoms, $R_3$ may be hydrogen; alkyl of 1 to 12 carbon atoms; or phenyl, $R_4$ and $R_5$ may be each independently hydrogen; or alkyl of 1 to 12 carbon atoms, $R_6$ to $R_9$ may be each independently hydrogen or methyl, Q may be Si, M may be Ti, and $X_1$ and $X_2$ may be each independently hydrogen or alkyl of 1 to 12 carbon atoms.

The compound represented by Formula 1 may be any one among the compounds represented by the following Formula 1-1 to Formula 1-10:

[Formula 1-1]

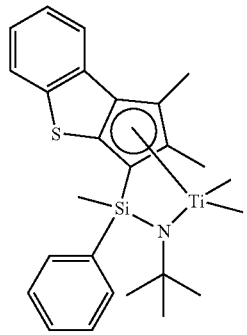

[Formula 1-2]

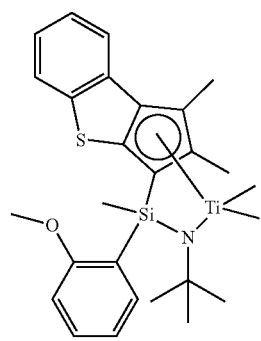

[Formula 1-3]

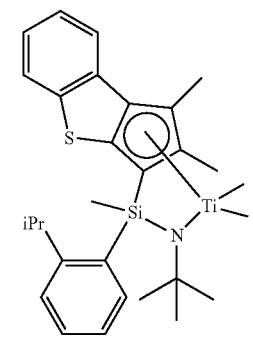

[Formula 1-4]

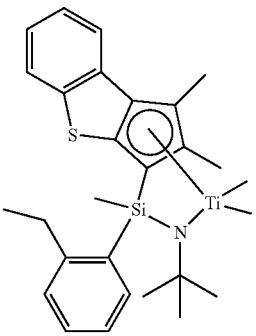

[Formula 1-5]

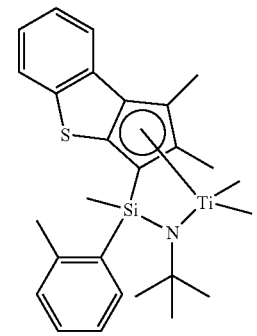

[Formula 1-6]

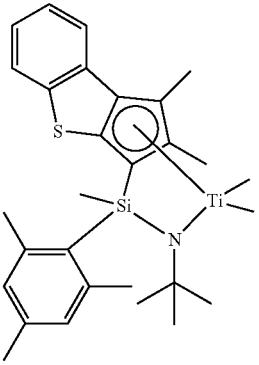

[Formula 1-7]

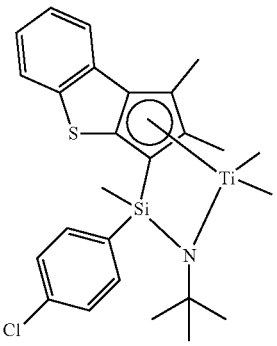

-continued

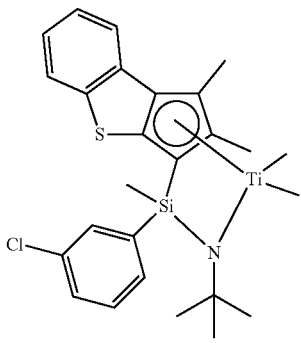
[Formula 1-8]

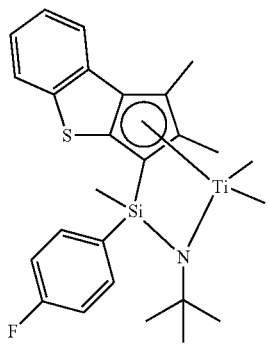
[Formula 1-9]

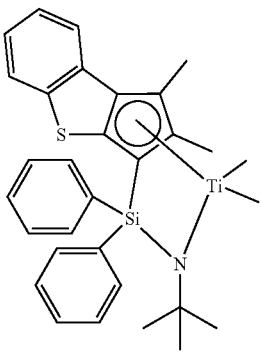
[Formula 1-10]

Additionally, compounds having various structures within the defined range by Formula 1 may be used.

In the transition metal compound represented by Formula 1, a metal site is connected by a cyclopentadienyl ligand introducing tetrahydroquinoline, and the structure thereof has a narrow Cp-M-N angle and a wide $Q_3$-M-$Q_4$ angle to which a monomer may approach. In addition, due to a ring-type bond, Cp, tetrahydroquinoline, nitrogen and the metal site are connected in order, and more stable and rigid pentagonal ring structure may be formed. Accordingly, if the compounds are applied after reacting with a cocatalyst such as methyl aluminoxane and $B(C_6F_5)_3$ and activating, an olefin-based copolymer having properties of high activity, high molecular weight and high copolymerization degree may be produced at a high polymerization temperature.

Each substituent defined in this disclosure will be explained in detail as follows.

The term "hydrocarbyl group" used in this disclosure means a monovalent hydrocarbon group of 1 to 20 carbon atoms, which is composed of only carbon and hydrogen irrespective of its structure, such as alkyl, aryl, alkenyl, alkynyl, cycloalkyl, alkylaryl and arylalkyl, unless otherwise referred to.

The term "halogen" used in this disclosure means fluorine, chlorine, bromine or iodine, unless otherwise referred to.

The term "alkyl" used in this disclosure means a linear chain or branch chain of a hydrocarbon residual group, unless otherwise referred to.

The term "alkenyl" used in this disclosure means a linear chain or branch chain of an alkenyl group, unless otherwise referred to.

The branched chain may be alkyl of 1 to 20 carbon atoms; alkenyl of 2 to 20 carbon atoms; aryl of 6 to 20 carbon atoms; alkylaryl of 7 to 20 carbon atoms; or arylalkyl of 7 to 20 carbon atoms.

According to an embodiment of the present invention, the aryl group may preferably have 6 to 20 carbon atoms, and may particularly be phenyl, naphthyl, anthracenyl, pyridyl, dimethylanilinyl, anisolyl, etc., without limitation.

The alkylaryl group means an aryl group substituted by the alkyl group.

The arylalkyl group means an alkyl group substituted by the aryl group.

The ring (or heterocycle) means a monovalent aliphatic or aromatic hydrocarbon group having 5 to 20 ring-forming atoms and including one or more heteroatoms, and may be a monocycle or a condensed ring of two or more rings. In addition, the heterocycle may be substituted or unsubstituted with an alkyl group. Examples of the ring may include indoline, tetrahydroquinoline, etc., without limitation.

The alkylamino group means an amino group substituted by the alkyl group, and may be dimethylamino, diethylamino, etc., without limitation.

According to an embodiment of the present invention, the aryl group may preferably have 6 to 20 carbon atoms, and may particularly be phenyl, naphthyl, anthracenyl, pyridyl, dimethylanilinyl, anisolyl, etc., without limitation.

The transition metal compound of Formula 1 is capable of introducing a large amount of alpha-olefin as well as a low-density polyethylene due to the structural characteristics thereof, and the preparation of a low-density polyolefin copolymer having a density degree of 0.89 g/cc or less, more particularly, 0.85 to 0.89 g/cc may be possible.

The transition metal compound of Formula 1 may be used solely, or as a composition type including one or more cocatalyst compounds represented by Formula 2, Formula 3 and Formula 4 below in addition to the transition metal compound of Formula 1, as a catalyst of polymerization reaction. The cocatalyst compound may assist the activation of the transition metal compound of Formula 1 above.

$$-[Al(R_{10})-O]_a- \quad \text{[Formula 2]}$$

$$A(R_{10})_3 \quad \text{[Formula 3]}$$

$$[L-H]^+[W(D)_4]^- \text{ or } [L]^+[W(D)_4] \quad \text{[Formula 4]}$$

In Formulae 2 to 4, $R_{10}$ groups may be the same or different from each other and each independently selected from the group consisting of halogen, hydrocarbyl of 1 to 20 carbon atoms, and halogen-substituted hydrocarbyl of 1 to 20 carbon atoms, A is aluminum or boron, D is each independently aryl of 6 to 20 carbon atoms or alkyl of 1 to 20 carbon atoms, of which one or more hydrogen atoms may be substituted with substituents, wherein the substituent is at least any one selected from the group consisting of halogen, hydrocarbyl of 1 to 20 carbon atoms, alkoxy of 1 to 20 carbon atoms and aryloxy of 6 to 20 carbon atoms, H is a hydrogen atom, L is a neutral or cationic Lewis acid, W is an element in group 13, and a is an integer of 2 or more.

Examples of the compound represented by Formula 2 may be an alkylaluminoxane such as methylaluminoxane (MAO), ethylaluminoxane, isobutylaluminoxane and butylalminoxane, and a modified alkylaluminoxane obtained by mixing two or more kinds of the alkylaluminoxane, particularly, methylaluminoxane, modified methylaluminoxane (MAO).

Examples of the compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. and particularly, may be selected from trimethylaluminum, triethylaluminum and triisobutylaluminum.

Examples of the compound represented by Formula 4 may include triethylammonium tetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliumtetraphenylboron, N,N-diethylaniliumtetrapentafluorophenylboron, diethylammoniumtetrapentafluorophenylboron, triphenylphosphoniumtetraphenylboron, trimethylphosphoniumtetraphenylboron, dimethylanilium tetrakis(pentafluorophenyl) borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl)boron, triphenylcarboniumtetra(p-trifluoromethylphenyl)boron, or triphenylcarboniumtetrapentafluorophenylboron.

The catalyst composition may be prepared by a method including 1) a step of obtaining a mixture by contacting the transition metal compound represented by Formula 1 with the compound represented by Formula 2 or Formula 3; and 2) a step of adding the compound represented by Formula 4 to the mixture, as the first method.

In addition, the catalyst composition may be prepared by a method of contacting the transition metal compound represented by Formula 1 with the compound represented by Formula 2, as the second method.

In case of the first method among the preparation methods of the catalyst composition, the molar ratio of the transition metal compound represented by Formula 1/the compound represented by Formula 2 or Formula 3 may be 1/5,000 to 1/2, particularly, 1/1,000 to 1/10, more particularly, 1/500 to 1/20. If the molar ratio of the transition metal compound represented by Formula 1/the compound represented by Formula 2 or Formula 3 is greater than 1/2, the amount of an alkylating agent is too small, and the alkylation of a metal compound may be incompletely carried out, and if the molar ratio is less than 1/5,000, the alkylation of the metal compound may be achieved, but the activation of the alkylated metal compound may be incompletely carried out due to the side reactions between an excessive amount of the alkylating agent remained and an activating agent of the compound represented by Formula 4. In addition, the molar ratio of the transition metal compound represented by Formula 1/the compound represented by Formula 4 may be 1/25 to 1, particularly, 1/10 to 1, more particularly, 1/5 to 1. If the molar ratio of the transition metal compound represented by Formula 1/the compound represented by Formula 4 is greater than 1, the amount of an activating agent is relatively small, and the activation of the metal compound is incompletely carried out, and thus, the activity of the catalyst composition may be deteriorated. If the molar ratio is less than 1/25, the activation of the metal compound may be completely carried out, but due to the excessive amount of the activating agent remained, it would not be economical considering the unit cost of the catalyst composition, or the purity of a polymer produced may be degraded.

In case of the second method among the preparation methods of the catalyst composition, the molar ratio of the transition metal compound represented by Formula 1/the compound represented by Formula 2 may be 1/10,000 to 1/10, particularly, 1/5,000 to 1/100, more particularly, 1/3,000 to 1/500. If the molar ratio is greater than 1/10, the amount of an activating agent is relatively small, and the activation of a metal compound may be incompletely carried out and the activity of the catalyst composition thus produced may be degraded, and if the molar ratio is less than 1/10,000, the activation of the metal compound may be completely carried out, but due to the excessive amount of the activating agent remained, it would not be economical considering the unit cost of the catalyst composition, or the purity of a polymer produced may be degraded.

As the reaction solvent during preparing the catalyst composition, a hydrocarbon-based solvent such as pentane, hexane, and heptane, or an aromatic solvent such as benzene and toluene may be used.

In addition, the catalyst composition may include the transition metal compound and the cocatalyst compound in a supported type on a support.

Any supports used in a metallocene-based catalyst may be used as the support without specific limitation. Particularly, the support may be silica, silica-alumina or silica-magnesia, and any one among them or a mixture of two or more thereof may be used.

In case where the support is silica among them, since a silica support and the functional group of the metallocene compound of Formula 1 form a chemical bond, there is no catalyst separated from the surface during an olefin polymerization process. As a result, the generation of fouling, by which polymer particles are agglomerated on the wall side of a reactor or from each other during the preparation process of an olefin-based copolymer, may be prevented. In addition, the particle shape and apparent density of a polymer in the olefin-based copolymer prepared in the presence of a catalyst including the silica support are excellent.

More particularly, the support may be silica or silica-alumina, including a highly reactive siloxane group and dried at a high temperature through a method of drying at a high temperature, etc.

The support may further include an oxide, a carbonate, a sulfate, or a nitrate component, for example, $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the cocatalyst, and if the temperature is greater than 800° C., the pores at the surface of the support may be combined to decrease the surface area, and a large amount of the hydroxyl groups at the surface may be removed to remain only siloxane groups to decrease reaction sites with the cocatalyst, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

Meanwhile, the polymerization reaction of the olefin-based copolymer may be performed by continuously injecting hydrogen and continuously polymerizing an olefin-based monomer in the presence of the catalyst composition.

The polymerization reaction of the olefin monomer may be performed in an inert solvent, and as the inert solvent, benzene, toluene, xylene, cumene, heptane, cyclohexane, methylcyclohexane, methylcyclopentane, n-hexane, 1-hexene, and 1-octene may be used, without limitation.

The polymerization of the olefin-based copolymer may be performed at about 25 to about 500° C. under a pressure of about 1 to about 100 kgf/cm².

Particularly, the polymerization of the olefin-based copolymer may be performed at a temperature of about 25 to about 500° C., particularly, 80 to 250° C., more preferably, 100 to 200° C. In addition, the reaction pressure during polymerization may be 1 kgf/cm² to 150 kgf/cm², preferably, 1 kgf/cm² to 120 kgf/cm², more preferably, 5 kgf/cm² to 100 kgf/cm².

The olefin-based copolymer may be usefully used for manufacturing a molded article.

The molded article may particularly include a blow molding molded article, an inflation molded article, a cast molded article, an extruded laminate molded article, an extruded molded article, a foam molded article, an injection molded article, a sheet, a film, a fiber, a monofilament, or a non-woven fabric.

MODE FOR CARRYING OUT THE INVENTION

Examples

Hereinafter, preferred embodiments will be suggested to assist the understanding of the present invention. However, the embodiments are provided only for easy understanding of the present invention, and the contents of the present invention is not limited thereto.

Preparation Example 1

Preparation of Transition Metal Compound 1

[Preparation of Ligand Compound]

Synthesis of N-tert-butyl-1-(1,2-dimethyl-3H-benzo[b]cyclopenta[d]thiophene-3-yl)-1,1-(methyl)(phenyl)silaneamine

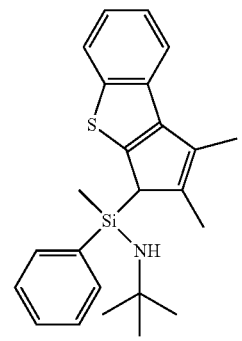 [SMILES: CC1=C(C)C([Si](C)(NC(C)(C)C)c2ccccc2)c2sc3ccccc3c21]

Preparation of chloro-1-(1,2-dimethyl-3H-benzo[b]cyclopenta[d]thiophene-3-yl)-1,1-(methyl)(phenyl)silane To a 250 ml schlenk flask, 10 g (1.0 eq, 49.925 mmol) of 1,2-dimethyl-3H-benzo[b]cyclopenta[d]thiophene and 100 ml of THF were put, and 22 mL (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 mL (1.0 eq, 49.925 mmol) of dichloro(methyl) (phenyl)silane and 70 mL of THF at −78° C., followed by stirring at room temperature overnight. After stirring, drying in vacuum was carried out and extraction with 100 ml of hexane was carried out.

Preparation of N-tert-butyl-1-(1,2-dimethyl-3H-benzo[b]cyclopenta[d]thiophene-3-yl)-1,1-(methyl)(phenyl)silaneamine To 100 ml of an extracted chloro-1-(1,2-dimethyl-3H-benzo[b]cyclopenta[d]thiophene-3-yl)-1,1-(methyl) (phenyl)silane hexane solution, 42 ml (8 eq, 399.4 mmol) of t-BuNH$_2$ was injected at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

$^1$H NMR (CDCl$_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

[Preparation of Transition Metal Compound]

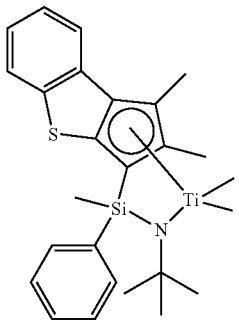

To a 100 ml schlenk flask, 4.93 g (12.575 mmol, 1.0 eq) of a ligand compound of Formula 2-4 and 50 mL (0.2 M) of toluene were put and 10.3 ml (25.779 mmol, 2.05 eq, 2.5M in hexane) of n-BuLi was added thereto dropwisely at −30° C., followed by stirring at room temperature overnight. After stirring, 12.6 mL (37.725 mmol, 3.0 eq, 3.0 M in diethyl ether) of MeMgBr was added thereto dropwisely, 13.2 ml (13.204 mmol, 1.05 eq, 1.0 M in toluene) of TiCl₄ was put in order, followed by stirring at room temperature overnight. After stirring, drying in vacuum and extraction with 150 ml of hexane were carried out, the solvent was removed to 50 ml, and 4 ml (37.725 mmol, 3.0 eq) of DME was added dropwisely, followed by stirring at room temperature overnight. Again, drying in vacuum and extraction with 150 ml of hexane were carried out. After drying the solvents, 2.23 g (38%, dr=1:0.5) of a brown solid was obtained.

¹H NMR (CDCl₃, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

Preparation Example 2

Preparation of Transition Metal Compound 2

[Preparation of Ligand Compound]

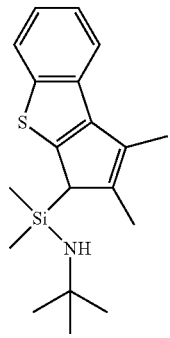

To a 100 ml, schlenk flask, 4.65 g (15.88 mmol) of chloro-1-(1,2-dimethyl-3H-benzo[b]cyclopenta[d]thiophene-3-yl)-1,1-dimethylsilane was weighed and added, and 80 mL of THF was injected thereto. tBuNH₂ (4 eq, 6.68 mL) was injected thereto at room temperature, and the reaction was performed at room temperature for three days. After finishing the reaction, THF was removed and the residue was filtered with hexane. After drying the solvent, 4.50 g (86%) of a yellow liquid was obtained.

¹H-NMR (in CDCl₃, 500 MHz): 7.99 (d, 1H), 7.83 (d, 1H), 7.35 (dd, 1H), 7.24 (dd, 1H), 3.49 (s, 1H), 2.37 (s, 3H), 2.17 (s, 3H), 1.27 (s, 9H), 0.19 (s, 3H), −0.17 (s, 3H)

[Preparation of Transition Metal Compound]

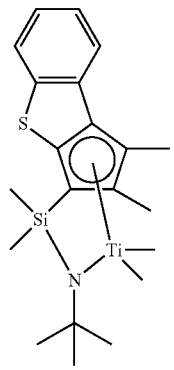

To a 50 ml, schlenk flask, N-tert-butyl-1-(1,2-dimethyl-3H-benzo[b]cyclopenta[d]thiophene-3-yl)-1,1-dimethylsilaneamine (1.06 g, 3.22 mmol/1.0 eq) prepared above and 16.0 mL (0.2 M) of MTBE were put and stirred first. N-BuLi (2.64 ml, 6.60 mmol/2.05 eq, 2.5 M in THF) was added thereto at −40° C., and the reaction was performed at room temperature overnight. Then, MeMgBr (2.68 mL, 8.05 mmol/2.5 eq, 3.0 M in diethyl ether) was slowly added thereto dropwisely at −40° C., and TiCl4 (2.68 mL, 3.22 mmol/1.0 eq, 1.0 M in toluene) was added thereto in order, and the reaction was performed at room temperature overnight. Then, the reaction mixture was passed through celite using hexane for filtering. After drying the solvent, 1.07 g (82%) of a brown solid was obtained.

¹H-NMR (in CDCl₃, 500 MHz): 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), −0.45 (s, 3H)

Example 1

Into a 1.5 L autoclave continuous process reactor, a hexane solvent (5 kg/h) and 1-octene (2 kg/h) were charged, and the top of the reactor was pre-heated to a temperature of 136° C. A triisobutylaluminum compound (0.05 mmol/min), the transition metal compound (0.45 μmol/min) prepared in Preparation Example 1 as a catalyst, a dimethylanilium tetrakis(pentafluorophenyl) borate cocatalyst (1.35 μmol/min) were injected into the reactor at the same time. Then, into the autoclave reactor, ethylene (0.87 kg/h) and a hydrogen gas (28 cc/min) were injected and a copolymerization reaction was continuously carried out while maintaining a pressure of bar and 136° C. for 30 minutes or more to prepare a copolymer. After drying for 12 hours or more, the physical properties were measured.

Examples 2 to 8

Copolymers were prepared by carrying out the same method as in Example 1 except for changing the amount of each material as shown in Table 1 below.

Comparative Examples 1 to 7

Solumer 8730L (SK innovation Co.) was purchased and used as Comparative Example 1, DF7350 (Mitsui Co.) was purchased and used as Comparative Example 3, and LC875 (LG Chem,) was purchased and used as Comparative Example 4.

As the catalysts of Comparative Examples 2, 5 and 6, the transition metal compound obtained in Preparation Example 2 was used, and copolymers were prepared by carrying out the same method as in Example 1 except for changing the amount of each material as shown in Table 1 below.

As the catalyst of Comparative Example 7, the transition metal compound obtained in Preparation Example 1 was used, and a copolymer was prepared by carrying out the same method as in Example 1 except for not injecting a hydrogen gas and changing the amount of each material as shown in Table 1 below.

specimen concentration: 1.0 mg/ml
injection amount: 200 μl
column temperature: 160° C.
Detector: Agilent High Temperature RI detector
Standard: Polystyrene (calibrated by cubic function)

4) Measurement of Hardness (Shore A)

Hardness was measured according to ASTM D2240 using GC610 STAND for Durometer of TECLOCK Co. and a Shore hardness tester Type A of Mitutoyo Co.

5) Measurement of Comonomer Content 50 mg of a specimen was taken and put in a vial, 1 ml of a TCE-d2 solvent was added thereto, and the specimen was completely dissolved using a heat gun and was transferred to a NMR tube. 1H NMR was measured with number of scan

TABLE 1

|  | catalyst (μmol/min) | cocatalyst (μmol/min) | TiBAl (mmol/min) | ethylene (kg/h) | hydrogen (cc/min) | Alpha olefin monomer | | Reaction temperature (° C.) |
|---|---|---|---|---|---|---|---|---|
|  |  |  |  |  |  | 1-octene (kg/h) | 1-butene (kg/h) |  |
| Example 1 | 0.45 | 1.35 | 0.05 | 0.87 | 28 | 2.00 | — | 136 |
| Example 2 | 0.60 | 1.80 | 0.05 | 0.87 | 20 | 2.00 | — | 150 |
| Example 3 | 0.60 | 1.80 | 0.05 | 0.87 | 35 | 2.00 | — | 149 |
| Example 4 | 0.25 | 0.75 | 0.05 | 0.87 | 30 | — | 0.80 | 135 |
| Example 5 | 0.27 | 0.81 | 0.05 | 0.87 | 34 | — | 0.90 | 135 |
| Example 6 | 0.38 | 1.14 | 0.05 | 0.87 | 19 | — | 0.91 | 151 |
| Example 7 | 0.25 | 0.75 | 0.05 | 0.87 | 45 | — | 0.90 | 135 |
| Example 8 | 0.40 | 2.40 | 0.05 | 0.87 | 30 | — | 1.00 | 150 |
| Comparative Example 2 | 0.70 | 2.10 | 0.05 | 0.87 | 0 | 2.20 | — | 150 |
| Comparative Example 5 | 0.37 | 1.11 | 0.05 | 0.87 | 0 | — | 1.00 | 150 |
| Comparative Example 6 | 0.38 | 1.14 | 0.05 | 0.87 | 0 | — | 1.00 | 151 |
| Comparative Example 7 | 0.40 | 2.40 | 0.05 | 0.87 | 0 | — | 1.00 | 151 |

Experimental Example 1

With respect to the copolymers of Examples 1 to 8, and Comparative Examples 1 to 7, physical properties were evaluated according to the methods below and are shown in Table 2 below.

1) Density of Polymer

Measured according to ASTM D-792.

2) Melt Index (MI) of Polymer

Measured according to ASTM D-1238 (condition E, 190° C., 2.16 kg load).

3) Weight Average Molecular Weight (g/Mol) and molecular weight distribution (MWD)

Number average molecular weight (Mn) and weight average molecular weight (Mw) were measured respectively, using gel permeation chromatography (GPC), and molecular weight distribution was calculated through dividing the weight average molecular weight by the number average molecular weight.

column: PL Olexis
solvent: trichlorobenzene (TCB)
flow rate: 1.0 ml/min (ns)=2048 (3 h 30 min), and measurement temperature of 393K. In order to remove 1-octene or 1-butene which may remain in the specimen, a polymer was reprecipitated and prepared prior to conducting the NMR analysis. In detail, 1 g of the polymer was completely dissolved in chloroform at 70° C., and the polymer solution thus obtained was slowly poured into 300 ml of methanol while stirring to re-precipitate the polymer. The re-precipitated polymer was dried in vacuum at room temperature. The above-described process was repeated one more to obtain a polymer from which 1-octene and 1-butene were removed.

50 mg of the specimen of the polymer thus obtained was dissolved in 1 ml of TCE-d2 solvent. Measurement was conducted with an acquisition time of three seconds and a pulse angle of 30° for 2048 times at room temperature using a Bruker AVANCEIII 500 MHz NMR equipment. The comonomer content was calculated using integration values of ethylene, 1-butene and 1-octene peaks in a region of 0.5-1.5 ppm. The number of double bonds was calculated based on the integration value of double bonds in a region of 4.5-6.0 ppm. *Macromolecules* 2014, 47, 3782-3790 was referred to.

TABLE 2

|  | Density (g/mL) | MI (g/10 min) | Mw | MWD | % [1-octene] (wt %) | % [1-butene] (wt %) | Hardness |
|---|---|---|---|---|---|---|---|
| Example 1 | 0.869 | 33.7 | 46000 | 2.05 | 35.8 | 0 | 66.2 |
| Example 2 | 0.873 | 17.0 | 55000 | 1.99 | 34.6 | 0 | 74.7 |
| Example 3 | 0.874 | 45.0 | 42000 | 1.98 | 33.9 | 0 | 65.7 |

TABLE 2-continued

|  | Density (g/mL) | MI (g/10 min) | Mw | MWD | % [1-octene] (wt %) | % [1-butene] (wt %) | Hardness |
|---|---|---|---|---|---|---|---|
| Example 4 | 0.875 | 20.0 | 53000 | 2.03 | 0 | 25.2 | 71.1 |
| Example 5 | 0.871 | 32.4 | 47000 | 2.01 | 0 | 27.0 | 67.1 |
| Example 6 | 0.868 | 34.3 | 46000 | 2.00 | 0 | 27.9 | 66.5 |
| Example 7 | 0.872 | 62.0 | 32000 | 2.02 | 0 | 27.6 | 64.5 |
| Example 8 | 0.865 | 58.2 | 35000 | 2.04 | 0 | 30.0 | 62.1 |
| Comparative Example 1 | 0.869 | 29.2 | 48000 | 2.34 | 37.9 | 0 | 61.4 |
| Comparative Example 2 | 0.870 | 33.4 | 46000 | 2.30 | 36.1 | 0 | 64.1 |
| Comparative Example 3 | 0.870 | 29.5 | 48000 | 1.93 | 0 | 26.8 | 65.8 |
| Comparative Example 4 | 0.869 | 30.0 | 47000 | 2.33 | 0 | 28.8 | 61.2 |
| Comparative Example 5 | 0.870 | 30.3 | 47000 | 2.16 | 0 | 28.2 | 64.7 |
| Comparative Example 6 | 0.870 | 34.0 | 46000 | 2.35 | 0 | 28.8 | 63.6 |
| Comparative Example 7 | 0.864 | 5.4 | 69000 | 2.18 | 0 | 29.1 | 48.9 |

Experimental Example 2

Tensile strength, elongation rate, and flexural modulus were measured for the olefin-based copolymers of Examples 1, 5 and 7, and Comparative Examples 1 to 6 according to the methods below and are shown in Table 3 below.

1) Tensile Strength and Elongation Rate of Polymer

Each of the olefin-based copolymers of Examples 1, 5 and 7, and Comparative Examples 1 to 6 were extruded to form a pellet, and the tensile strength and tensile elongation when braking were measured based on ASTM D638 (50 mm/min).

2) Flexural Modulus of Polymer

The flexural modulus (Secant 1%) was measured according to ASTM D790.

TABLE 3

|  | Kind of comonomer | density (g/mL) | MI (g/10 min) | Tensile strength (kgf/cm$^2$) | Elongation rate (%) | Flexural modulus (Secant 1%) (kgf/cm$^2$) |
|---|---|---|---|---|---|---|
| Example 1 | 1-octene | 0.869 | 33.7 | 33.5 | 1,000 or more | 12.0 |
| Comparative Example 1 | 1-octene | 0.869 | 29.2 | 32.6 | 1,000 or more | 10.9 |
| Comparative Example 2 | 1-octene | 0.870 | 33.4 | 29.1 | 1,000 or more | 10.5 |
| Example 5 | 1-butene | 0.871 | 32.4 | 26.7 | 700 | 16.2 |
| Example 7 | 1-butene | 0.868 | 34.3 | 28.6 | 550 | 15.7 |
| Comparative Example 3 | 1-butene | 0.870 | 29.5 | 25.6 | 500 | 15.6 |
| Comparative Example 4 | 1-butene | 0.869 | 30.0 | 21.3 | 700 | 12.3 |
| Comparative Example 5 | 1-butene | 0.870 | 30.3 | 23.8 | 600 | 14.9 |
| Comparative Example 6 | 1-butene | 0.870 | 34.0 | 27.5 | 436 | 14.5 |

The olefin-based copolymer according to the present invention is a low-density olefin-based copolymer and may show increased tensile strength, elongation rate and flexural modulus with equivalent density and melt index as the conventional olefin-based copolymer. Particularly, if pairing up the olefin-based copolymers prepared using the same comonomer (alpha-olefin monomer) and showing equivalent density and MI and comparing in Table 3, the olefin-based copolymer of the Examples showed improved hardness and satisfied Equation 1, and as a result, equivalent or better elongation rate and higher tensile strength and flexural modulus were shown when compared with those of the olefin-based copolymers of the Comparative Examples.

If the hardness, density and MI of the olefin-based copolymers of Example 1 and Comparative Examples 1 and 2 were put into Equation 1, Example 1 satisfied the conditions of Equation 1 but Comparative Example 1 and Comparative Example did not reach the lower limit range of A values, respectively, and did not satisfy Equation 1. Accordingly, the olefin-based copolymer of Example 1 showed higher tensile strength and flexural modulus than the olefin-based copolymers of Comparative Example 1 and Comparative Example 2. In addition, the olefin-based copolymer of Example 1 also showed a smaller molecular weight distribution (MWD) value than the olefin-based copolymers of Comparative Example 1 and Comparative Example 2.

In addition, if comparing Example 5 with Comparative Examples 4 and 5, as compared above, the olefin-based copolymer of Example 5 satisfied the conditions of Equation 1 but Comparative Examples 4 and 5 did not satisfy the conditions of Equation 1. Accordingly, the olefin-based copolymer of Example 5 showed higher tensile strength and flexural modulus than the olefin-based copolymers of Comparative Examples 4 and 5.

In addition, if comparing the olefin-based copolymer of Example 7 with the olefin-based copolymer of Comparative Example 6, better elongation rate, tensile strength and flexural strength were found to be achieved.

Through such experiments, it could be confirmed that the olefin-based copolymer according to the present invention satisfied the conditions of Equation 1 and showed higher tensile strength, elongation rate and flexural modulus than the conventional olefin-based copolymers such as Comparative Example 1, Comparative Example 3 and Comparative Example 4.

In addition, since the olefin-based copolymer according to the present invention is prepared by polymerizing an olefin-based monomer by injecting hydrogen in 10 to 100 cc/min in the presence of a catalyst composition for polymerizing olefin, including the transition metal compound of Formula 1, the hydrogen improves the hardness of the olefin-based copolymer to improve the tensile strength, flexural modulus and elongation rate. However, the olefin-based copolymers of Comparative Examples 2 and 5 to 7, which were polymerized without injecting hydrogen, could not satisfy the conditions of Equation 1 and showed relatively inferior physical properties such as hardness, tensile strength, flexural modulus, elongation rate, etc.

Particularly, the olefin-based copolymers of Example and Comparative Example 7 showed different physical properties according to the injection or not of hydrogen even though the amount of each material was the same in the presence of the same catalyst composition. Particularly, the olefin-based copolymer of Comparative Example 7 showed low MI and could not satisfy the conditions of Equation 1.

The invention claimed is:

1. An olefin-based copolymer comprising a repeating unit derived from an alpha-olefin,
   wherein the repeating unit is present in the olefin-based copolymer from 25.2 wt % to 45 wt %,
   wherein the olefin-based copolymer has:
   a density (d) of 0.85 to 0.89 g/cc
   a melt index (MI), measured at 190° C. and 2.16 kg load, of 15 g/10 min to 100 g/10 min, and
   a Shore A hardness defined by Equation 1, Hardness=$0.0082 \times MI^2 - 0.99 \times d \times MI + A$  [Equation 1]

wherein $97 \times d < A < 101 \times d$.

2. The olefin-based copolymer according to claim 1, wherein the olefin-based copolymer has a weight average molecular weight (Mw) of 10,000 g/mol to 80,000 g/mol.

3. The olefin-based copolymer according to claim 1, wherein the olefin-based copolymer has a molecular weight distribution (MWD) of 1.5 to 3.0.

4. The olefin-based copolymer according to claim 1, wherein the Shore A hardness ranges from 30 to 80.

5. The olefin-based copolymer according to claim 1, wherein the olefin-based copolymer is a copolymer of ethylene and an alpha-olefin comonomer of 3 to 12 carbon atoms.

6. The olefin-based copolymer according to claim 5, wherein the alpha-olefin comonomer comprises any one selected from propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, or a mixture of two or more thereof.

7. A method for preparing the olefin-based copolymer of claim 1, the method comprising:
   polymerizing an olefin-based monomer by injecting hydrogen in 10 to 100 cc/min in the presence of a catalyst composition to prepare an olefin-based copolymer, the catalyst composition comprising a transition metal compound represented by Formula 1:

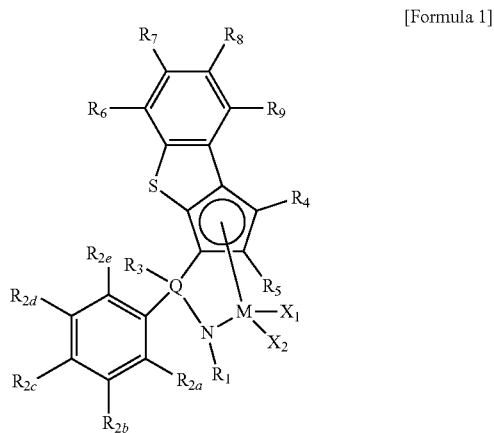

[Formula 1]

in Formula 1, $R_1$ is hydrogen, alkyl of 1 to 20 carbon atoms, cycloalkyl of 3 to 20 carbon atoms, alkenyl of 2 to 20 carbon atoms, alkoxy of 1 to 20 carbon atoms, aryl of 6 to 20 carbon atoms, arylalkoxy of 7 to 20 carbon atoms; alkylaryl of 7 to 20 carbon atoms, or arylalkyl of 7 to 20 carbon atoms, $R_{2a}$ to $R_{2e}$ are each independently hydrogen, halogen, alkyl of 1 to 20 carbon atoms, cycloalkyl of 3 to 20 carbon atoms, alkenyl of 2 to 20 carbon atoms, alkoxy of 1 to 20 carbon atoms, or aryl of 6 to 20 carbon atoms, $R_3$ is hydrogen, halogen, alkyl of 1 to 20 carbon atoms, cycloalkyl of 3 to 20 carbon atoms, alkenyl of 2 to 20 carbon atoms, aryl of 6 to 20 carbon atoms, alkylaryl of 6 to 20 carbon atoms, arylalkyl of 7 to 20 carbon atoms, alkyl amido of 1 to 20 carbon atoms, aryl amido of 6 to 20 carbon atoms, alkylidene of 1 to 20 carbon atoms, or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen, silyl, alkyl of 1 to 20 carbon atoms, cycloalkyl of 3 to 20 carbon atoms; alkenyl of 2 to 20 carbon atoms, aryl of 6 to 20 carbon atoms, alkylaryl of 7 to 20 carbon atoms, arylalkyl of 7 to 20 carbon atoms, or a metalloid radical of a metal in group 14, which is substituted with hydrocarbyl of 1 to 20 carbon atoms, among the $R_6$ to $R_9$, adjacent two or more are optionally connected with each other to form a ring, Q is Si, C, N, P or S, M is a transition metal in group 4, and $X_1$ and $X_2$ are each independently hydrogen, halogen, alkyl of 1 to 20 carbon atoms, cycloalkyl of 3 to 20 carbon atoms, alkenyl of 2 to 20 carbon atoms, aryl of 6 to 20 carbon atoms, alkylaryl of 7 to 20 carbon atoms; arylalkyl of 7 to 20 carbon atoms, alkylamino of 1 to 20 carbon atoms, arylamino of 6 to 20 carbon atoms, or alkylidene of 1 to 20 carbon atoms.

8. The method for preparing the olefin-based copolymer according to claim 7, wherein $R_1$ is hydrogen, alkyl of 1 to 12 carbon atoms, cycloalkyl of 3 to 12 carbon atoms, alkoxy of 1 to 12 carbon atoms, aryl of 6 to 12 carbon atoms, arylalkoxy of 7 to 13 carbon atoms, alkylaryl of 7 to 13 carbon atoms, or arylalkyl of 7 to 13 carbon atoms, $R_{2a}$ to $R_{2e}$ are each independently hydrogen, halogen, alkyl of 1 to 12 carbon atoms, cycloalkyl of 3 to 12 carbon atoms' alkenyl of 2 to 12 carbon atoms, alkoxy of 1 to 12 carbon atoms, or phenyl, $R_3$ is hydrogen, halogen; alkyl of 1 to 12 carbon atoms, cycloalkyl of 3 to 12 carbon atoms, alkenyl of 2 to 12 carbon atoms, alkylaryl of 7 to 13 carbon atoms, arylalkyl of 7 to 13 carbon atoms, phenyl, or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl, $R_4$ to $R_9$ are each independently hydrogen, alkyl of 1 to 12 carbon atoms, cycloalkyl of 3 to 12 carbon atoms, aryl of 6 to 12 carbon atoms, alkylaryl of 7 to 13 carbon atoms, or arylalkyl of 7 to 13 carbon atoms, among the $R_6$ to $R_9$, adjacent two or more are optionally connected with each other to form an aliphatic ring of 5 to 12 carbon atoms or an aromatic ring of 6 to 12 carbon atoms, the aliphatic ring or the aromatic ring may be substituted with halogen, alkyl of 1 to 12 carbon atoms, alkenyl of 2 to 12 carbon atoms, or aryl of 6 to 12 carbon atoms, Q is Si, M is Ti, and $X_1$ and $X_2$ are each independently hydrogen, halogen, alkyl of 1 to 12 carbon atoms, or alkenyl of 2 to 12 carbon atoms.

9. The method for preparing the olefin-based copolymer according to claim 7, wherein the transition metal compound is one selected from the group consisting of compounds of 1-1 to Formula 1-10:

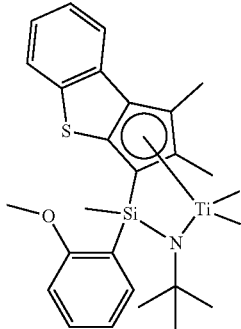

[Formula 1-1]

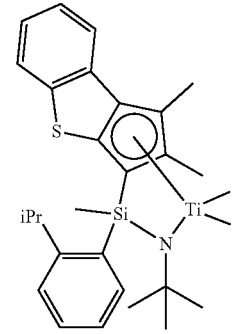

[Formula 1-2]

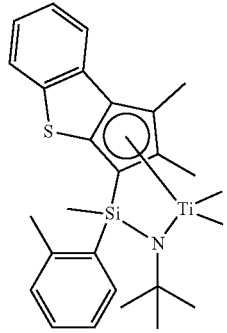

[Formula 1-3]

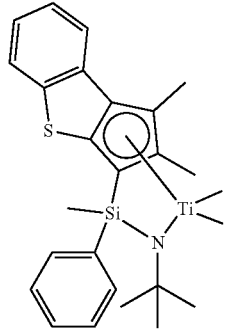

[Formula 1-4]

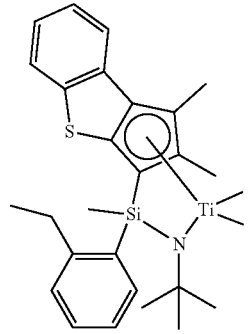

[Formula 1-5]

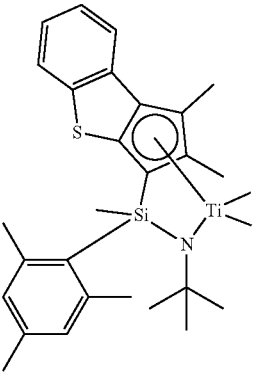

[Formula 1-6]

[Formula 1-7]
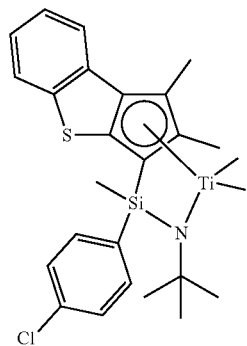
[Formula 1-8]
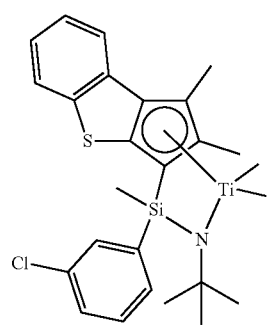
[Formula 1-9]
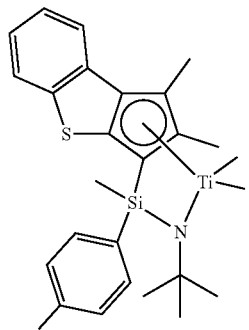
[Formula 1-10]
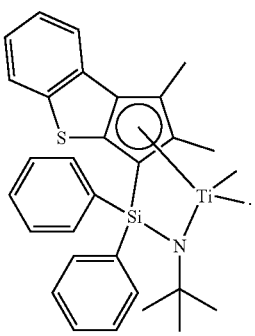
10. The method for preparing the olefin-based copolymer according to claim 7, wherein the polymerizing is performed at 110° C. to 160° C.
* * * * *